(No Model.)
W. R. HARRIS.
BELT OR STRAP FASTENER.
No. 346,747. Patented Aug. 3, 1886.
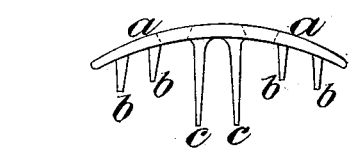
Fig. 1
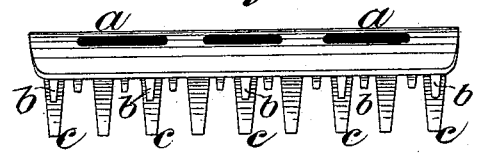
Fig. 2
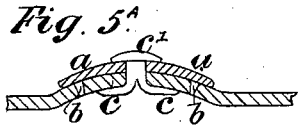
Fig. 5ᴬ
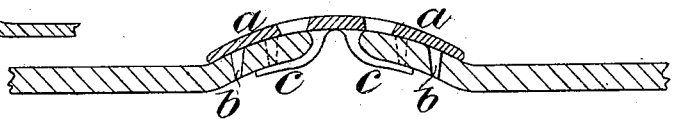
Fig. 3
Fig. 4.
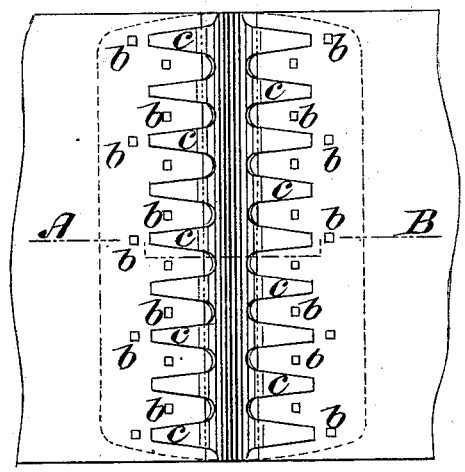
Fig. 5.
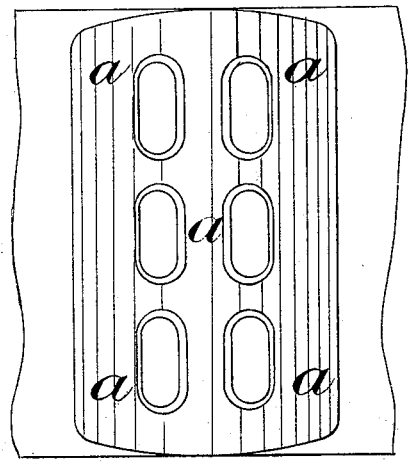
Fig. 6    Fig. 8
Fig. 7    Fig. 9
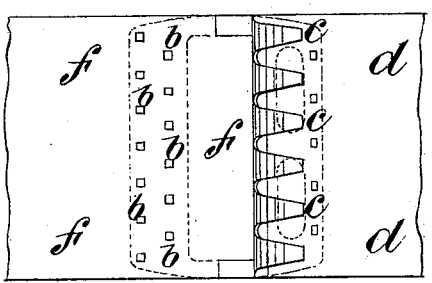 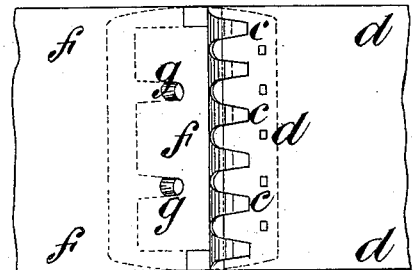
Witnesses:
Aly. Barkoff
David S. Williams.
Inventor:
Wm R. Harris
by his Attorneys
Howson and Sons

UNITED STATES PATENT OFFICE.

WILLIAM RANDALL HARRIS, OF MANCHESTER, COUNTY OF LANCASTER, ENGLAND.

BELT OR STRAP FASTENER.

SPECIFICATION forming part of Letters Patent No. 346,747, dated August 3, 1886.

Application filed June 1, 1886. Serial No. 203,774. (No model.) Patented in England May 11, 1886, No. 6,315.

*To all whom it may concern:*

Be it known that I, WILLIAM RANDALL HARRIS, a citizen of the United States, at present residing at Manchester, county of Lancaster, England, have invented certain Improvements in Strap-Fasteners, (for which I have obtained protection in Great Britain, No. 6,315, dated May 11, 1886,) of which the following is a specification.

My invention relates to the fasteners adopted for use in attaching together the ends of driving straps or belts, or in attaching together lengths of strapping to form belts. A well-known strap-fastener patented by me in England in the year 1867 is furnished with rows of teeth or spikes, which are caused to penetrate the material of the two belt ends to be connected. To render this fastener more secure I provide clamps, which are hammered or pressed down over the edges of the belt ends.

In the accompanying drawings, Figure 1 represents an end view of one of my improved belt-fasteners; Fig. 2, a side view of the same. Fig. 3 is a longitudinal section of a belt-joint secured by means of the fastener. Fig. 4 shows the inside of the joint. Fig. 5 shows the outside or back of the same. Fig. 5$^A$ shows a modification. Fig. 6 is a section of a joint suitable for belts which require to be tightened. Fig. 7 is a plan of the same; and Figs. 8 and 9 are corresponding views of a slight modification.

In Figs. 1 to 5, $a$ is the back plate of the fastener, and $b$ $b$ are the teeth or spikes, which project from the concave under side of the said back plate, as is usual in this description of fastener. The clamping parts or clamps which I employ in accordance with my present invention are indicated by $c$ $c$. The fastener illustrated in the drawings is supposed to be cast all in one piece, and annealed or softened, as in the ordinary method of making malleable castings. The clamps $c$ $c$ may consist of ribs or webs projecting from the back plate, or of serrated webs, or plates, or of isolated teeth, spikes, or pins. In the example the said clamps consist of isolated or nearly isolated spikes or teeth, which taper both in width and thickness from their connection with the plate to their outer ends, this being the construction and form which I now consider to be suitable. In the application of the fastener, the ordinary teeth or spikes $b$ are driven into the belt ends, as when fixing the fastener formed in accordance with my former invention, the ends of the belt being brought as closely as possible to the clamps $c$. When the fastener has been thus applied in the ordinary manner, the attachment is rendered more secure by hammering, pressing, or bending over and down the clamps upon the material of the belt ends, so that the said ends become tightly clamped against the inner surface of the back plate, as clearly indicated in Figs. 3 and 4. The teeth $b$ need not necessarily extending entirely through the material of the belt. To keep the metal as much as possible from contact with the pulleys or drums when the belt is in use, I prefer to make the back plate a little more concave than in the case of the ordinary or old form of fastener. In the example, the clamps $c$ are arranged to enter between the teeth $b$ in the inner row of the same, this being the arrangement I prefer. In place of the clamps $c$ being formed as teeth, I may use thin projecting ribs, either plain or serrated at their outer edges, so as to clear the inner row of teeth $b$, or suitably-shaped clamps, which can be bent over and down upon the belt ends to clamp the same to the back plate, substantially as indicated in the drawings.

In the modification illustrated by Fig. 5$^A$, the clamps $c$ are not made in one piece with the back plate, but are cast or formed as a separate piece, the back plate being formed with a slot, through which the clamps are passed an enlarged head, $c'$, preventing them from passing entirely through the slot. The clamps, when hammered or pressed down, hold the strap exactly in the same manner as in the previously-described examples. More than one of these separately formed clamps may be applied in the cases of broad fasteners. In any case there may be only one row of the teeth $b$ on each side, as in the case of the fasteners, shown in Fig. 5$^A$; or there may be more than two rows, if considered to be necessary. The fasteners may be made of a suitable material other than malleable cast-iron.

In Figs. 6 and 7 the fastener is intended to be permanently fastened by one end only to the belting. One side of the fastener is provided with teeth or spikes, and with the clamps c, whereby the fastener is firmly secured to the strap end d. The other side of the fastener is provided only with the ordinary teeth b. In the back plate is formed a slot or opening e, through which the other strap end f, is passed, the teeth b preventing the strap from being drawn out by the strain. When it is desirable to tighten the belt, the end f is drawn farther through the slot and the projecting piece is cut off.

In the modification illustrated by Figs. 8 and 9 the part f of the belt is intended to be punched to suit projecting teeth g g, which enter the holes punched in the belt end and keep the said end in place.

I claim—

1. A strap or belt fastener having a back plate, a, holding-teeth b, and clamp c, substantially as and for the purpose set forth.

2. A strap or belt fastener having a back plate provided with teeth to be driven into the substance of the parts to be secured, and clamping-teeth arranged, substantially as described, and adapted to be bent or clamped down upon the ends of the parts to be secured together, substantially as set forth.

In testimony whereof I have signed my name to this specification in the presence of two subscribing witnesses.

WILLIAM RANDALL HARRIS.

Witnesses:
WM. TURNER,
Clerk with W. H. Vaudrey, Solicitor, Manchester.
C. CHADWICK.